July 8, 1924.
W. HERINGER
WINDOW SASH STOP AND LOCK
Filed Jan. 31, 1922
1,500,130
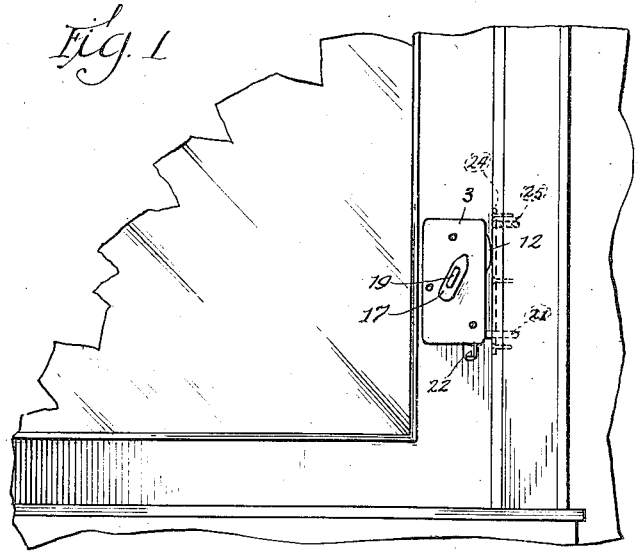
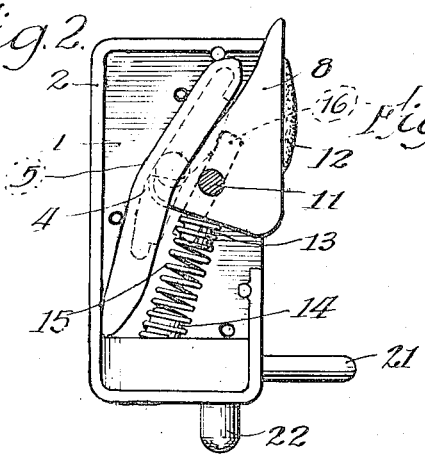
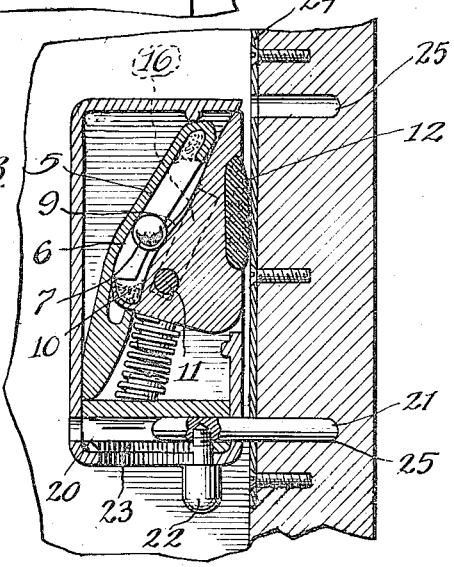
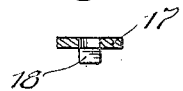
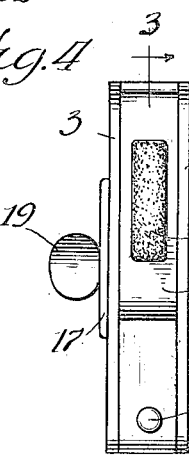
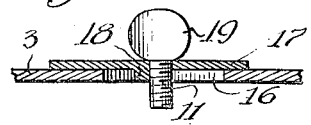
Inventor
William Heringer
By Winfield S. Williams
Atty.

Patented July 8, 1924.

1,500,130

UNITED STATES PATENT OFFICE.

WILLIAM HERINGER, OF DOGDEN, NORTH DAKOTA.

WINDOW-SASH STOP AND LOCK.

Application filed January 31, 1922. Serial No. 533,021.

*To all whom it may concern:*

Be it known that I, WILLIAM HERINGER, a citizen of Rumania, residing at Dogden, in the county of McLean and State of North Dakota, have invented a new and useful Improvement in a Window-Sash Stop and Lock, of which the following is a specification.

My invention relating to improvements in window sash stop and lock has for its main object the automatic support of a window sash in any desired position on raising the window, the automatic locking of the window against rattling, and manually locking in any desired position.

As illustrated in the accompanying drawings:

Figure 1 is a broken away corner of a window frame and window sash.

Figure 2 is the device with cover plate removed.

Figure 3 is a section along lines 3—3, Figure 4.

Figure 4 is a view of the operative end of the device.

Figure 5 is a cross-section of the friction cover plate of Figure 6.

Figure 6 is the assemblage of the locking arrangement for the automatic support.

As illustrated, 1 is a base-plate, 2 is the enclosing walls on three sides and part way on the fourth side; 3 is a cover-plate forming in conjunction with 1 and 2 a box. Angularly assembled in the described box, I have an arm 4 with a raceway 5 and an elbow 6. A ball 7 functions in said raceway 5 co-operating with a substantially triangular shoe 8; the said shoe 8 has a raceway and hump 9 on the edge adjacent arm 4, which raceway and hump 9 terminate in a pocket 10 arranged for carrying a lubricating composition. I may use a plurality of balls where one is shown.

A threaded hole 11 is made in shoe 8 near the base and off from a central line using a lug 13 as a center in conjunction with the apex of the triangle of shoe 8. On the edge of shoe 8 opposite to the edge 9 I provide a frictional material 12, preferably inserted in the said edge, but it may be attached by an adhesive. I provide a lug 13 on the base of shoe 8 and a lug 14 on frame 2 as bearing points for a spring 15 which is adapted to force shoe 8 upward. In base-plate 1 and cover-plate 3, I provide registering slots 16; said slots registering with hole 11 in shoe 8. A locking face plate 17 has a lug 18 which travels in slot 16 and a centrally located hole is adapted for the passage therethrough of a threaded end of a wing-nut 19 which threads into the triangular shoe 8, at 11.

I provide a secondary chamber 20 in which is slidable a bolt 21 impellable forward or backward by an externally extending thumb-head 22, which thumb-head 22 moves in guiding slot 23. I provide a jamb-plate 24 fixed to the jamb and having holes therethrough registering with holes 25 in the jamb.

The device operates thus: On raising the window the triangular shoe 8 is forced back upon spring 15, immediately the upward movement of the window ceases the spring 15 drives the triangular shaped shoe 8 into frictional contact with the jamb, at the same time the sharp angle of arm 4 co-operating with the adjacent hump 9 of shoe 8 wedges shoe 8 and takes up any loose play between the sash and the window frame. A slight turn of wing-nut 19 against plate 17 locks shoe 8 in rigid position. To release the sash a slight turn is given to wing-nut 19, and if it is desired to lower the sash a slight pressure on the wing-nut resists the pressure of spring 15 and releases the shoe 8. The ball bearing provides an easy movement and more universal joint action for the shoe.

It will readily be seen that the device automatically wedges the sash not only supporting the same at any position desired, but it also automatically overcomes any tendency of the sash to movement in any direction, thus preventing rattling. For protection against the raising of the sash by one outside, bolt 21 provides a fixed locking in combination with the locking of the shoe 8.

What I claim is:

1. In combination with a window sash a resiliently actuated shoe movable obliquely in relation to the sash and the window frame; operatively associated with an obliquely inclined fixed track whereby to secure wedging engagement; and means co-acting with the weight of the sash to automatically sustain pressure engagement between the sash and the window frame.

2. The combination with a window sash of a spring actuated obliquely movable substantially triangular shoe having a frictional surface adapted to be brought into contact with the window frame, a surface in slidable contact with an obliquely positioned fixed track and means to constantly sustain frictional engagement between the shoe and the window frame whereby the sash is sustained at a desired elevation.

3. The combination with a window sash of a mechanism consisting of a fixed obliquely positioned track member, an obliquely movable wedge member having its apex upward and slidably operable on the fixed track member and automatic means cooperating with the weight of the sash whereby to force wedging engagement of the wedge member between the fixed track member and the window frame.

4. The combination with a window sash and a window frame, of a mechanism consisting of a fixed track member having a ball raceway thereon, a movable substantially triangular member having one of its edges grooved to register with the raceway on the fixed member, and a ball thrust functioning between said fixed member and said movable member.

5. In a device for the purposes described, the combination of a fixed track member, a movable wedge shaped shoe member associated with and operable upon said track there being a rolling thrust bearing therebetween, and a spring acting upon the shoe member to automatically force engagement of the wedge member between the fixed track member and the window frame.

6. In a device for the purposes described the combination with a window sash of a fixed obliquely positioned track member, a ball bearing thereon, a movable wedge shaped member operable thereon and having one side in frictional engagement with the window sash, automatic means for propelling the movable member along said track member whereby a wedging engagement of the movable wedge shaped member is had between the fixed track member and the window frame, and a manual locking means whereby the movable member may be locked in wedging engagement.

7. In a device for the purposes described, a fixed track member, a movable wedge-shaped member operable on said track and contacting with the window frame, an elbow on the track member whereby the movable wedgeshaped member is brought into rapid wedging engagement between it and the window frame, and automatic means coacting with the weight of the sash to sustain the engagement.

8. In a device for the purposes described, a fixed track member, a movable wedge-shaped member operable on said track and contacting with a window frame, a rolling bearing assembled between said movable member and said track; and resilient means impressing the movable wedgeshaped member and coacting with the weight of the window sash whereby to automatically sustain the said sash at a predetermined elevation.

Signed at Dogden, county of McLean and State of North Dakota, this 27" day of January, 1922.

WILLIAM HERINGER.

Witnesses:
GLENN D. THAYER,
J. A. ROSS.